US006739404B2

(12) United States Patent
Keigley

(10) Patent No.: US 6,739,404 B2
(45) Date of Patent: May 25, 2004

(54) WHEEL SUPPORTED IMPLEMENT FOR WORKING AND GRADING SOIL

(75) Inventor: Kevin V. Keigley, Osceola, IN (US)

(73) Assignee: Absolute Innovations, Inc., Osceola, IN (US)

( * ) Notice: Subject to any disclaimer, the term of this patent is extended or adjusted under 35 U.S.C. 154(b) by 107 days.

(21) Appl. No.: 09/829,736

(22) Filed: Apr. 10, 2001

(65) Prior Publication Data

US 2002/0144828 A1 Oct. 10, 2002

(51) Int. Cl.$^7$ ................................................ A01B 59/00
(52) U.S. Cl. ..................... 172/684.5; 172/699; 172/685
(58) Field of Search ............................. 172/684.5, 669, 172/237, 238, 158, 164, 174, 456, 311, 626, 452, 439, 699, 685

(56) References Cited

U.S. PATENT DOCUMENTS

| | | | | |
|---|---|---|---|---|
| 512,573 A | * | 1/1894 | Ayre | 172/132 |
| 1,665,532 A | * | 4/1928 | Cook | 172/78 |
| 2,620,610 A | * | 12/1952 | Chambers | 172/240 |
| 2,790,366 A | * | 4/1957 | McKinzie | 172/439 |
| 2,797,542 A | * | 7/1957 | Webster et al. | 172/328 |
| 3,448,814 A | * | 6/1969 | Jackson et al. | 172/149 |
| 3,812,919 A | * | 5/1974 | Baughman et al. | 172/328 |
| 3,926,262 A | * | 12/1975 | Brooks | 37/219 |
| 3,952,490 A | * | 4/1976 | Brockman | 56/400.14 |
| 4,393,943 A | * | 7/1983 | Andersson | 172/260.5 |
| 4,858,698 A | * | 8/1989 | Williamson et al. | 172/448 |
| 4,898,247 A | * | 2/1990 | Springfield | 172/799.5 |
| 5,054,278 A | * | 10/1991 | Thorndike | 56/400.14 |
| 5,535,832 A | * | 7/1996 | Benoit | 172/195 |
| 5,806,605 A | * | 9/1998 | Keigley | 172/145 |
| 5,833,012 A | * | 11/1998 | Pierce et al. | 172/199 |
| 6,012,534 A | * | 1/2000 | Kovach et al. | 172/196 |
| 6,032,746 A | * | 3/2000 | Lowery | 172/445.1 |

* cited by examiner

Primary Examiner—Thomas B. Will
Assistant Examiner—Alicia Torres
(74) Attorney, Agent, or Firm—Botkin & Hall, LLP

(57) ABSTRACT

An implement for preparing seed beds and lawns, and for grading tracks and show rings, includes a main frame upon which scarifying teeth are mounted to penetrate and scarify the soil, tines which work the soil and prepare the final grade, and a blade for grading soil. The frame is supported on wheels, and attached to a tractor by a three-point hitch. Accordingly, the depth of penetration of the scarifying teeth and the angle at which the tines work the soil, may be adjusted by pivoting the implement about the axis defined by the axles of the wheels by using the tractor hydraulic system. Since this degree of adjustment is limited, the wheels are mounted to the frame by an adaptor plate including multiple openings, any of which the axle of a wheel to thereby adjust the height of the frame relative to the ground to accommodate both loose or hard soil. The implement may also be attached to the front plate of a front end loader, in which the front plate angle relative to the lift arms of the skid steer loader may be adjusted to effect the depth of penetration of the scarifying teeth and angle at which the tines work the soil.

9 Claims, 9 Drawing Sheets

WHEEL SUPPORTED IMPLEMENT FOR WORKING AND GRADING SOIL

BACKGROUND OF THE INVENTION

This invention relates to implement for working and grading soil.

Many instances exist in which soil must be smooth, worked and graded. For example preparation of lawn and seed beds, particularly around new construction requires removal of vegetation, small rocks, twigs, etc., verifying of the soil, and grading and leveling soil to work the soil to the final grade prior to planting and seeding. Similarly, show rings in which animals such as horses are displayed, must be repeatedly graded, scarified, and smoothed. Particularly in the case of show rings, it is important that the depth at which the soil is scarified be closely controlled.

Prior U.S. Pat. No. 5,806,605 discloses an implement that grades, works and scarifies soil and is particularly useful in landscaping work, in that the implement is towed behind a small tractor or similar vehicle and is connected to the tractor by a conventional three-point hitch, so that the implement may be raised and lowered and the angle of the implement may be adjusted relative to ground. Scarifying teeth are located on the frame, and the depth of penetration of the scarifying teeth is controlled by controlling the angle and height of the implement through the three-point hitch. Accordingly, the operator must be very skilled, in that the height and angle of the implement must almost continuously be adjusted, particularly when the implement is used on uneven terrain. Accordingly, an experienced operator is required. The implement also includes a blade which grades the soil and also includes a tined member which works the soil and provides the final grade. An operator over time, develops the skill necessary to properly use the implement if the same operator operates the implement on a regular basis. However, preparation of show rings is most often done by volunteers or inexperienced operators. These operators do not regularly use the implement, and it is difficult for them to develop the required skill.

SUMMARY OF THE INVENTION

According to the invention, an implement for scarifying, grading and working soil is mounted on a pair of wheels. Accordingly, the implement is supported so that the angle of the implement main frame may be easily controlled through the three-point hitch connecting the implement to a tractor and the tractor hydraulic controls. Since the scarifying teeth are mounted on the main frame, the depth of penetration can be easily set by setting the aforementioned angle, and this depth of penetration will remain constant regardless of terrain. Accordingly, continual adjustment of the implement by using the tractor hydraulic controls via the three-point hitch is not required, and the angle of the tines which work the soil is similarly maintained. Accordingly, relatively unskilled operators are able to successfully operate the implement, and the depth of penetration of the scarifying teeth and angle of the tines will remain substantially constant.

According to another aspect of the invention, the implement may be mounted on the lift arms of a skid steer loader. The angle of the tines and depth of penetration scarifying teeth are similarly controlled due to the provision of the wheel supports, enabling the lift arms of the front end loader to be set to a position which allows the implement to rest upon the ground. The angle of the plate on which the implement is mounted can then be adjusted to control the depth of penetration of the scarifying teeth and the angle of the tines. Reference is made to U.S. Pat. Nos. 5,413,181 and 5,515,625, which disclose similar implements mounted on a skid steer loader.

DETAILED DESCRIPTION

Figure 1:
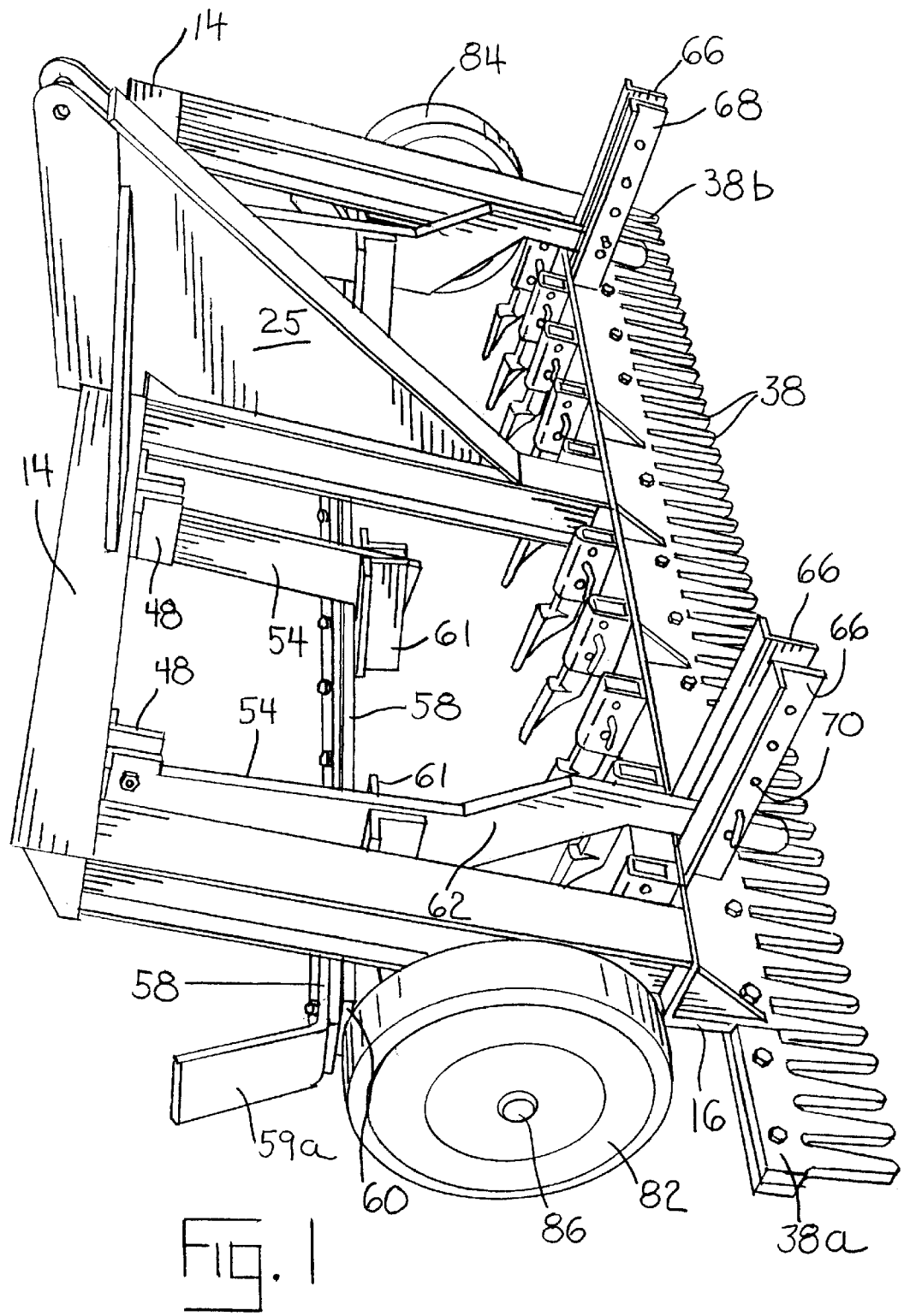
FIG. 1 is a view in perspective of an implement made according to the teachings of the present invention.

Referring now to the drawings, an implement generally indicated by the numeral 10 includes a main frame generally indicated by the numeral 12 which includes a pair of substantially parallel main frame members 14 and 16 which extend transversely across the path along which the implement 10 is pulled by a tractor indicated in phantom at 18. A pair of side frame members 20, 22 interconnect the main frame members 14 and 16. The main frame member 14 is provided with a conventional three point hitch assembly generally indicated by numeral 24, consisting of hitch points 26, 28 and 30, which are adapted to be connected to corresponding hitch points on tractor 18 in a manner well known to those skilled in the art. A reinforcing member 25 connects the hitch assembly to main frame member 16.

Figure 2:
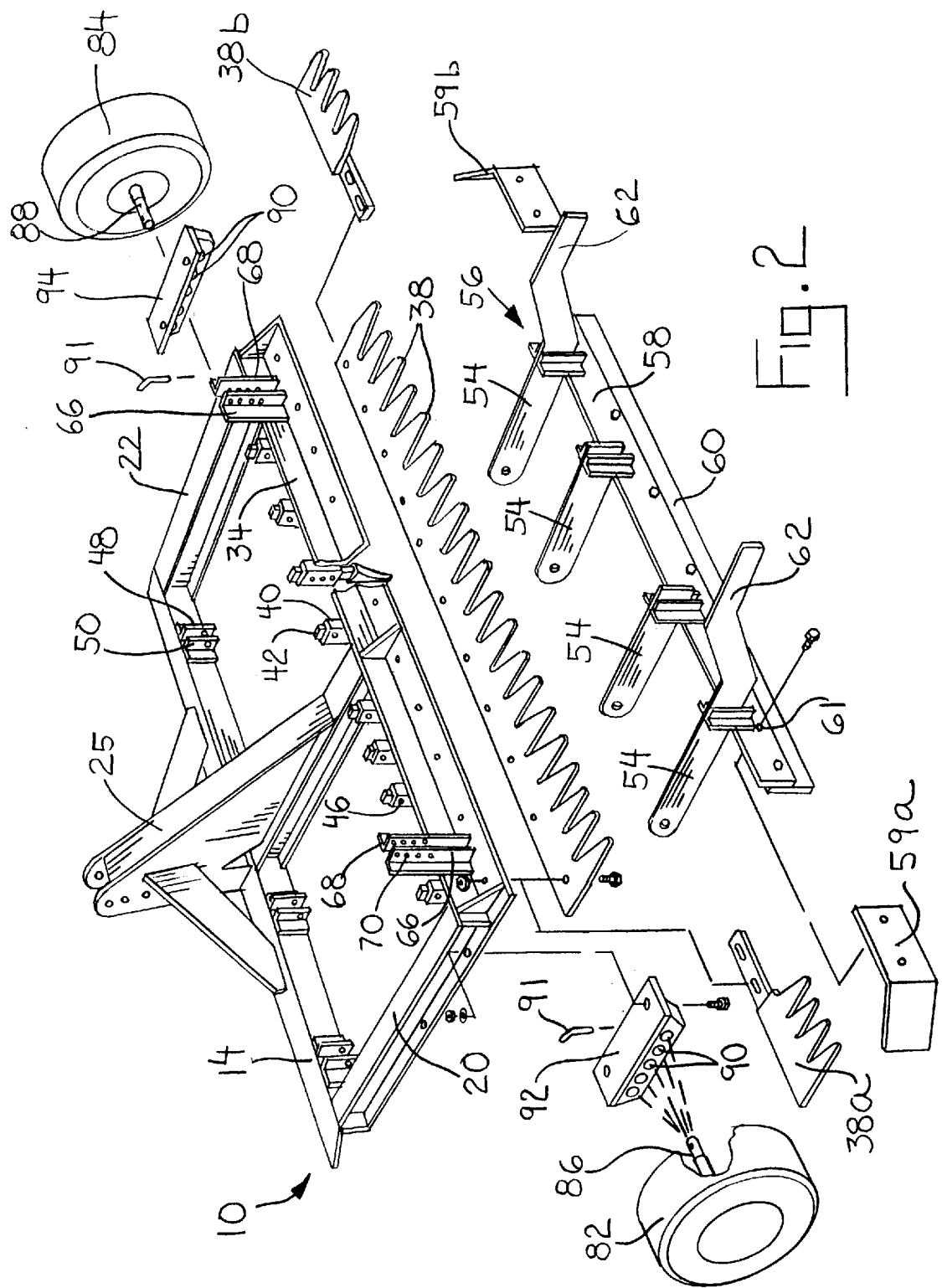
FIG. 2 is an exploded view in perspective illustrating the components of the implement of the present invention.
Figure 3:
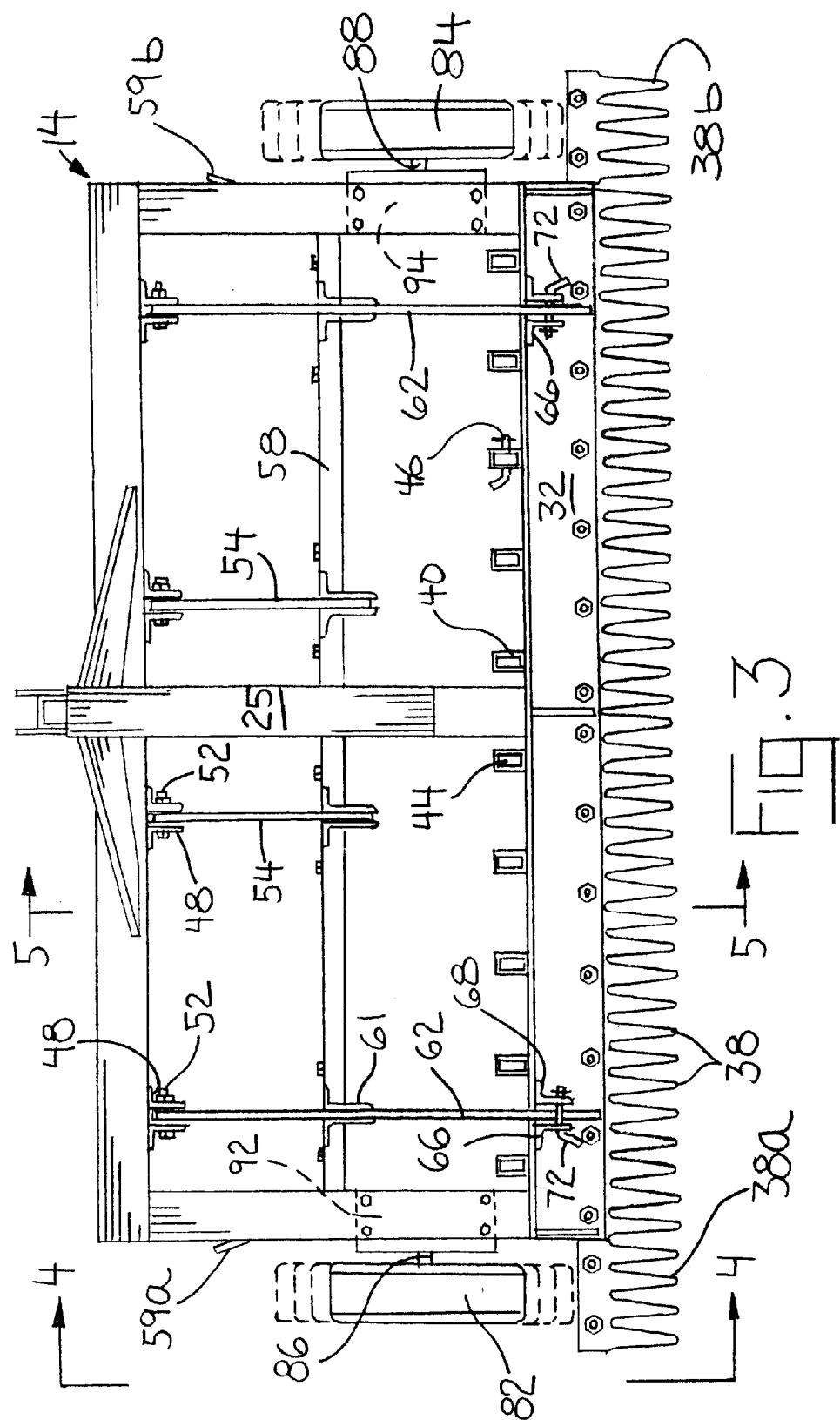
FIG. 3 is a top plan view of the implement according to the present invention.

The main frame 12 is supported by ground engaging members such as wheels 82, 84. Wheels 82, 84 are rotatively mounted on axles 86, 88. Each of the axles 86, 88 are received in one of the openings 90 in adaptor plates 92, 94 mounted respectively on side frame member 20, 22, on the main frame 14. Appropriate fasteners such as bolts as illustrated in FIG. 2 are used to secure the adaptor plates 90, 92 to main frame 14. As is most clearly illustrated in FIGS. 5–8, the main frame 14 is disposed at an angle during use. The angle of the main frame with respect to the ground can be controlled by operating appropriate tractor adjustments which move the hitch point 26 to adjust orientation of the main frame 14. Since axles 86 and 88 define a transverse axis extending transverse to the path along which the implement is towed, the angle of the main frame with respect to the ground is set by pivoting the main frame about the aforementioned axis defined by the axles 86, 88.

The main frame member 16 includes a pair of lips 32, 34 which are connected together such that the lip 34 extends from the lip 32 at substantially right angles. A tined member generally indicated by the numeral 36 is mounted to the lip 32 and includes tines 38 which project from the lip 32 in a direction substantially parallel to the direction of travel of the implement 10. The tines 38 are relatively closely spaced, and when engaged with the soil, work and level the soil to provide a final grade as will hereinafter be explained.

Extension tine sections 38a, 38b extend the tines 38 over the path traversed by the wheels 82, 84. The tines 38, and the lips 32 and 34, cooperate to define a scoop for capturing soil to permit soil to be transferred as will also be hereinafter explained.

Transversely spaced sockets generally indicated by the numeral 40 are secured, for example, by welding, to the side of the lip 34 opposite the side from which the lip 32 extends. Each of the sockets 40 slidably receive a scarifying tooth 42. Each of the scarifying teeth 42 are made of a strong, solid material such as steel and has a cross-section compatible with the cross-section of the sockets 40 so that the scarifying teeth 42 are slidably received within the sockets 40. Each of the sockets 40 and teeth 42 as provided with cooperating, transversely extending apertures 44. A clinch pin 46 is installed in one of the apertures 44 and extends through the corresponding scarifying tooth 42 to hold the tooth 42 in the socket 40. Because a series of aligned openings 44 are provided, the distance that the scarifying teeth extends from the corresponding socket, and, therefore, the distance that the scarifying teeth penetrate into the ground, is adjustable. Since the scarifying teeth 42 wear, the scarifying teeth 42 also may be extended from their corresponding sockets 40 to compensate for wear while maintaining penetration of the tooth into the ground at a predetermined distance. Since the sockets 40 are welded to the lip 34, the teeth 42 are rigidly attached to the main frame member 16 so that the scarifying teeth 42 may be used to scarify soil during the movement of the implement 10 either forward or backward. For proper scarifying, the teeth must not be too close together, or the teeth will merely pull soil instead of scarifying the soil, and must not be spaced too far apart, or scarifying will be inadequate. Is has been found that placing the sockets 40 about every eight inches (on center) is about the optimum spacing.

Brackets 48 are secured along the length of the main frame member 14 and are provided with an aperture 50 for receiving a pivot pin 52 for pivotally connecting subframe members 54 to the main frame member 14. The subframe members 54 are components of a subframe generally indicated by the numeral 56 and are secured to transverse subframe member 58 through bracket 61 which provides a rigid connection between the subframe members 54 and transverse subframe member 58. A grading blade 60 is secured to the transverse subframe member 58 and is adapted to engage the soil as will hereinafter be explained. Deflecting extensions 59a, 59b extend the transverse subframe member 58 and grading blade 60 and deflect soil inwardly. The subframe members 54 adjacent the side frame members 20 and 22 are provided extensions 62 which are slidably received in a gap 64 defined between a first set of spaced apart channel members 66, which extend upwardly from main frame member 16 and are secured to the lip 34 adjacent the side frame member 22, and a second set of channel members 68, which are similarly secured to the lip 34 of main frame member 16 adjacent the side frame member 20. The channel members 66, 68 are each provided with registering apertures 70 which receive a removable clinch pin 72 as will hereinafter be described. The width of the gap 64 is sufficient to permit the extensions 62 to move up and down within the gap 64 while the channel members retrains transverse movement of the subframe members 54.

Figure 5:
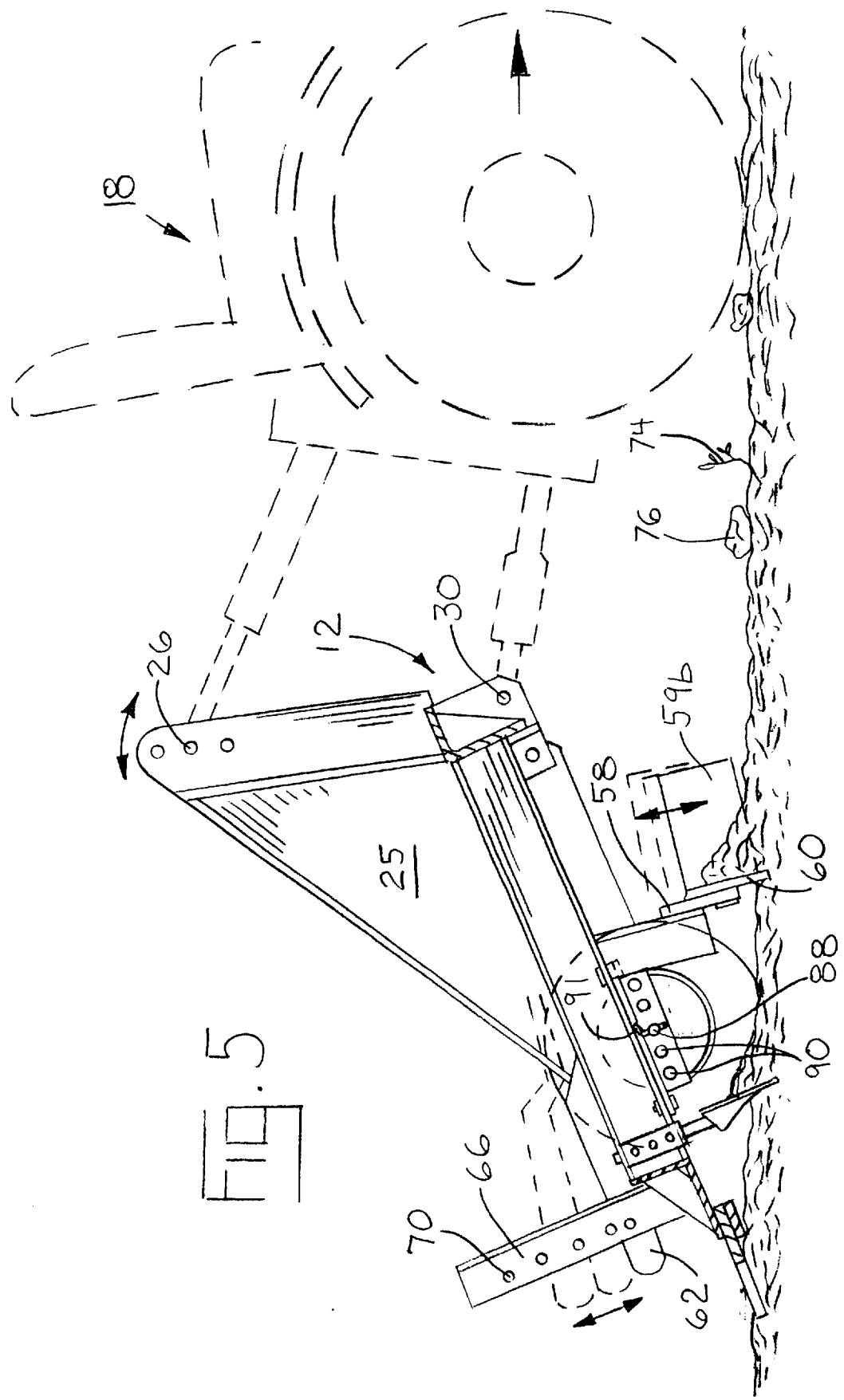
FIG. 5 is cross-sectional view taken substantially along lines 5—5 of FIG. 3.

In operation, and referring to FIG. 5, the implement 10 is illustrated as being used in the normal manner. Because of the pivotal connection between the subframe 56 and the main frame 12, the blade 60 is permitted to "float" as the implement is pulled along a path over the ground. In this condition, the blade 60 knocks down vegetation as at 74 and collects small rocks and stones 76 and grades lightly but does not penetrate the ground to any appreciable extent. The scarifying teeth 42 are set to penetrate the ground to scarify and break up the soil, and are followed by the tines 38, which work the soil and provide a final grade. The pin 72 is placed in the uppermost of the apertures 70 to thereby limit upward movement of the subframe 56. If it is desired to restrict the movement or flotation of the blade 60 to a greater extent, the pin 72 may be placed in the aperture just below the uppermost aperture.

Figure 4:
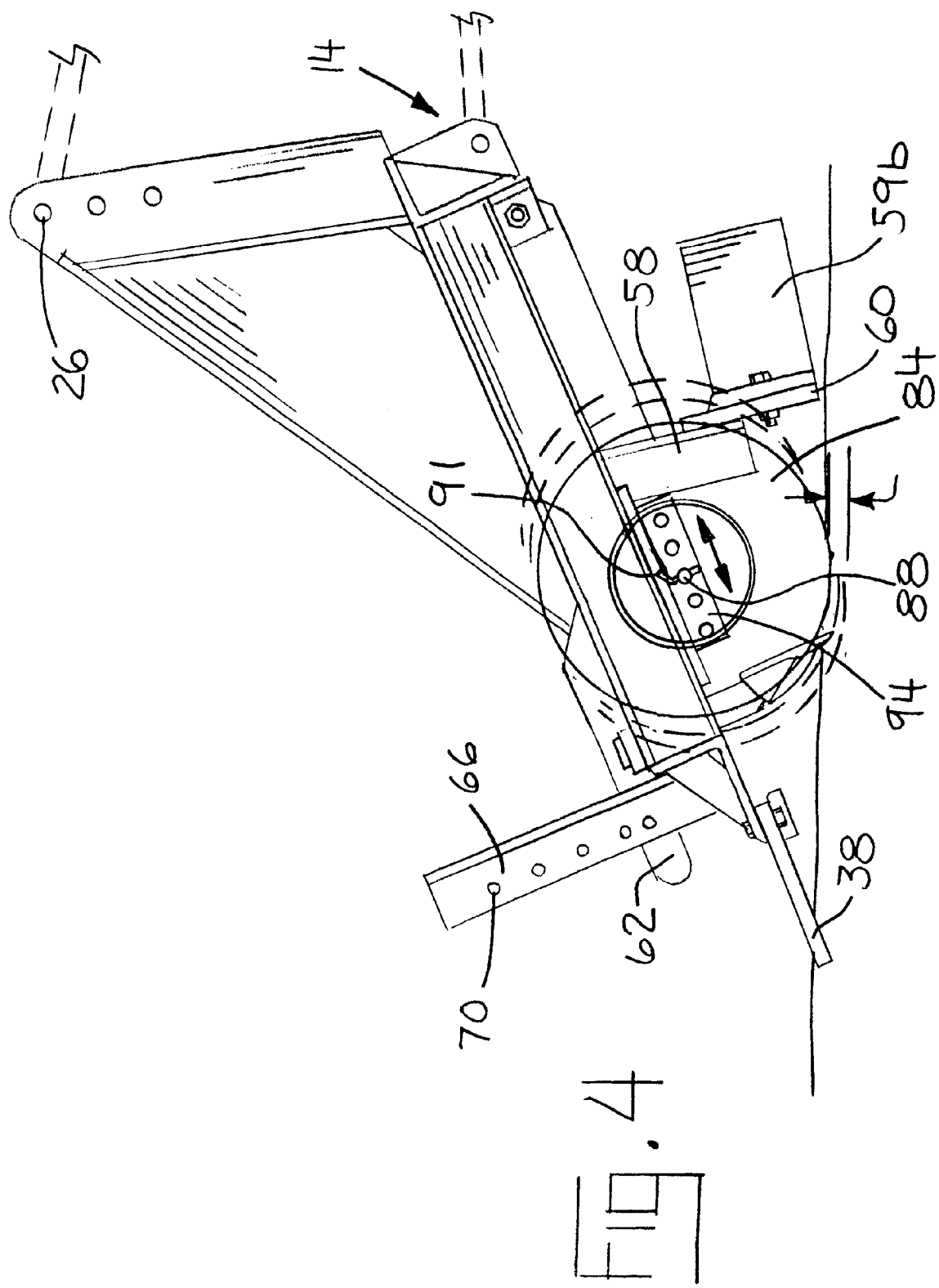
FIG. 4 is a view taken substantially along lines 4—4 of FIG. 3.

In many instances, it is important that soil be scarified only to a predetermined depth. In the present invention, the main frame 12 is rotatable about a transverse axis defined by the axles 86, 88 of the wheels 82 and 84. Accordingly, the vehicle operator is able to control the depth of penetration of the scarifying teeth 42, and also the angle at which the tines 38 engage the soil, by adjusting the angle of the main frame 12 about the axis defined by the axles 86, 88, operating the three-point hitch using the hydraulic controls of the tractor. Since the wheels 82, 84 remained engaged with the ground, once the angle of the main frame 12 relative to the wheels 82, 84 is set, the depth that the scarifying teeth 42 penetrate into the ground, and the angle of the tines, will remain constant if the implement 10 is used on uneven terrain. The angle of the main frame with respect to the wheels will remain constant, and the depth of penetration of the scarifying teeth 42 will also remain constant. The angle about which the frame may be adjusted relative to the wheels 82, 84 is limited, so the adaptor plates 92, 94 have been provided with their spaced apertures 90. The axles 86, 88 are secured in the selected apertures 90 by pins 91. By moving the axles to a different set of apertures 90, the elevation of the main frame relative to the ground will be changed, as indicated by the increment "X" (about ½ inch) in FIG. 4. Accordingly, the wheels may be raised relative to the frame or relative to the frame depending if the ground is especially loose or especially firm, or if an unusually deep penetration of the scarifying teeth 42 is desired. The desired angle of the frames first estimated, the axles 86, 88 are installed in the appropriate apertures 90, and the final penetration of the teeth 42 is adjusted by using the hydraulic controls of the tractor to adjust the angle of the main frame 12 by rotating the main frame about the axis defined by the axles of the wheels.

Figure 6:
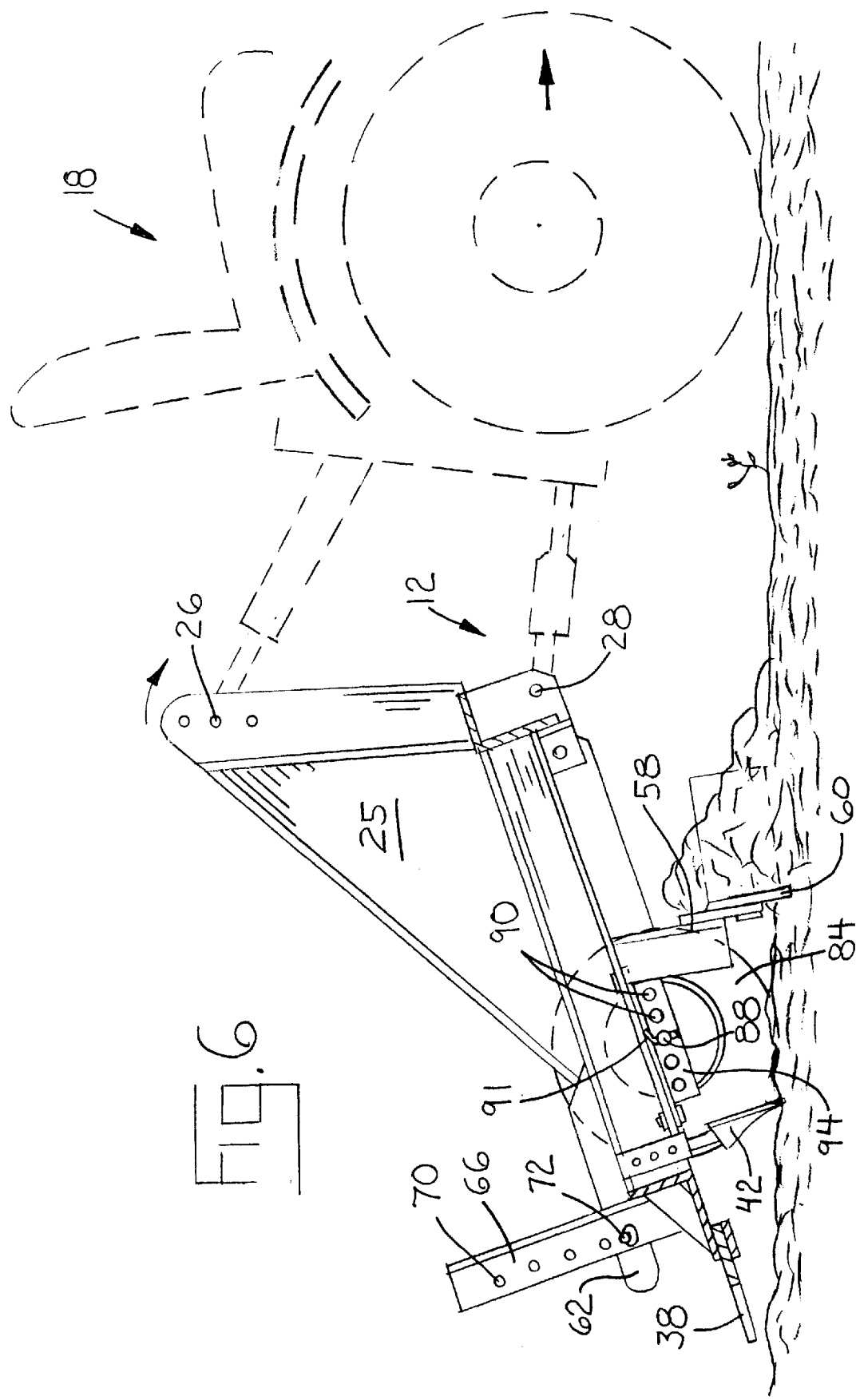
FIG. 6, FIG. 7 and FIG. 8 are all views similar to FIG. 5, but illustrating the manner in which the implement of the present invention is used.
Figure 7:
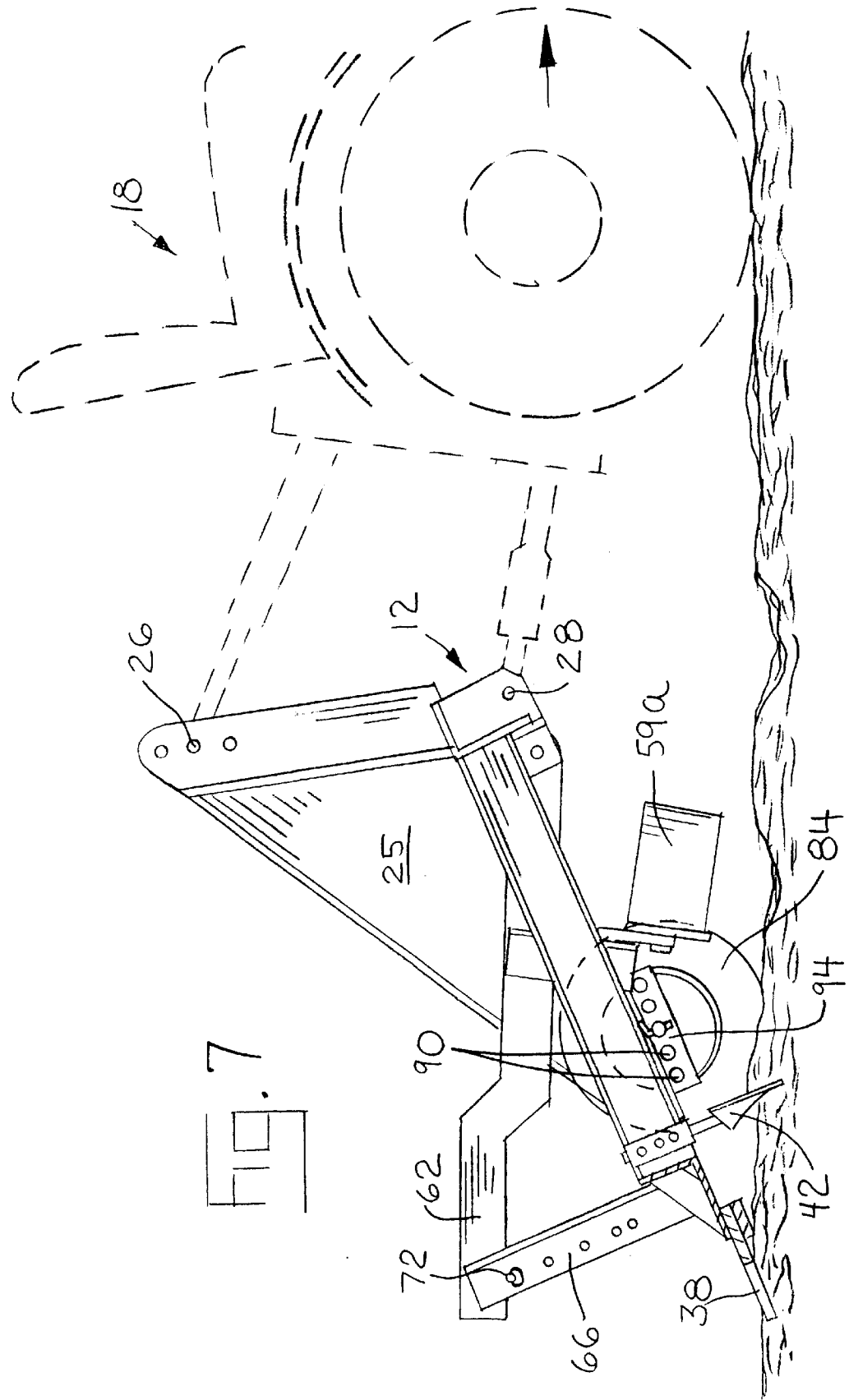

There are situations in which it is necessary to use the blade 60 to provide a deeper penetration to level off high spots in the soil. Accordingly, the main frame 12 is raised relative to the subframe 56 such that the upper edges of the extension 62 are below the lower most of the apertures 70. As illustrated in FIG. 6, the pin 72 is placed through the appropriate apertures, and locks the blade 60 in the lowered position with both the scarifying teeth 42 and tines 38 raised above the surface of the soil. Accordingly, grading can be effected on an initial pass over the seedbed, which may be followed by passes in which the seedbed is scarified, worked and leveled, as indicated in FIG. 6. In FIG. 7, an initial grade has been provided and the vegetation and rocks have been removed beforehand. The subframe 56 is raised relative to the main frame 12 and the pins 72 are placed in the uppermost apertures 70 such that the lower surfaces of 78 are engaged with the pins, thus locking the blade 60 in a position where it does not engage the soil, the main frame 12 having been set at an angle that permits the scarifying teeth to penetrate the soil and the tines 38 to engage the soil for working and providing a final grade.

Figure 8:
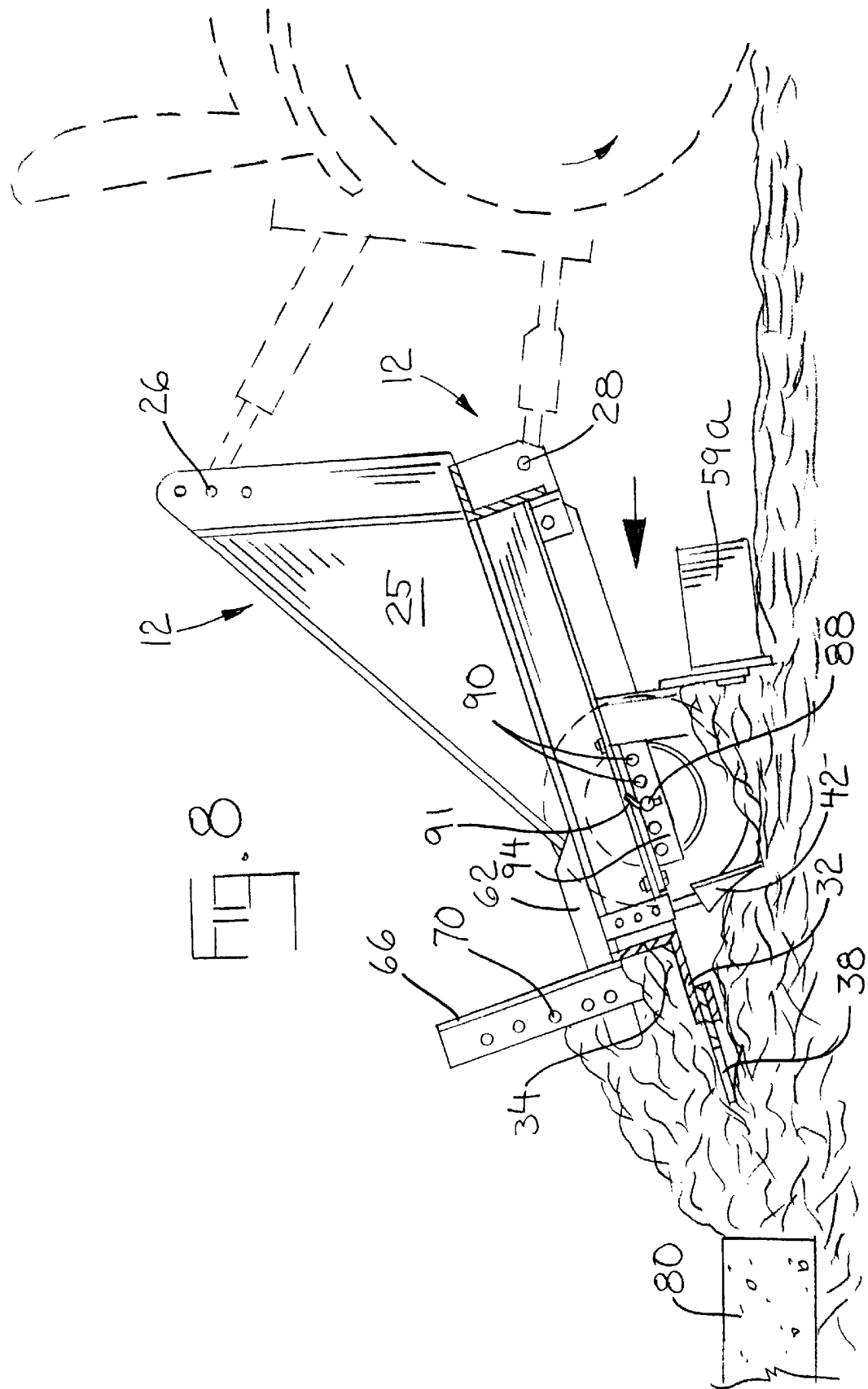

There are times during landscape work when soil must be moved to fill in low spots, particularly along concrete work such as along driveways and sidewalks. Particularly with new construction, care must be taken that no substantial weight be placed on the concrete which has not yet fully cured. Accordingly, it is not permissible to drive heavy equipment, such as tractors, on or over the concrete work. Referring to FIG. 8, the lips 32, 34 of the main frame member 16 along with the tines 38 define a scoop in which soil is caught and can be transferred to fill in low places, particularly low places adjacent concrete work generally indicted by the numeral 80. After soil has been deposited in the low place, the soil may be worked into a final grade by using the tines 38 as above described. Accordingly, soil may be positioned accurately to fill in low places, all without driving the tractor over adjacent concrete driveways and sidewalks.

Figure 9:
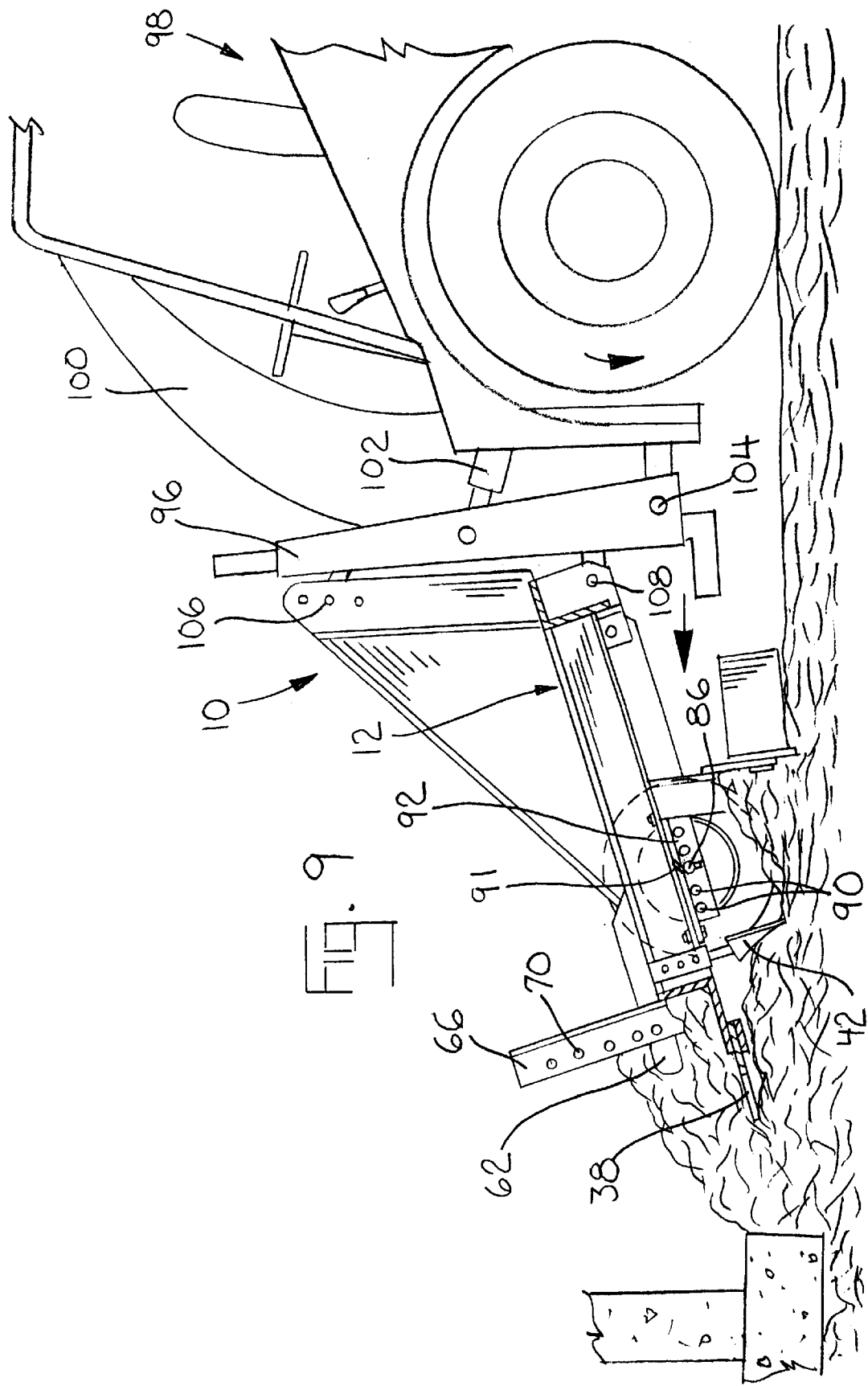
FIG. 9 is a cross-sectional view similar to FIG. 5 but illustrating the manner in which the implement of the present invention is used on a skid steer tractor.

Referring now to the embodiment of FIG. 9, the implement 10 is illustrated as being secured to the front plate 96 of a skid steer loader generally indicated by the numeral 98. Skid steer loaders of the type illustrated at 98 include a pair of lift arms, only one of them being illustrated at 100, that are capable of raising and lowering the front plate 96. Provision is also made, via hydraulic cylinder 102 and pivot connection 104, to pivot the front plate 96 relative to the arms 100. Accordingly, the implement 10 is attached to plate 96 via connections 106, 108. The lift controls for arms 100 may be set so that the cylinders raising and lowering the lift arms 100 are in their "exhaust" position. Accordingly, the lift arms 100 will remain in their lowermost position. In this position, the wheels 82, 84 of the implement 10 remain engaged with the ground regardless of the terrain over which the front skid steer loader 98 is operated. The front plate 96 may then be pivoted to adjust the depth of penetration of the scarifying teeth 42 and also the angle at which the tines 38 engage the ground. Again, since the angle of adjustment of the front plate 96 is limited, the wheels 82 may be used to adjust the main frame 12 and is supported above ground as in the preferred embodiment by moving the axles 86, 88 of the wheels to a different set of the apertures 70 and the brackets 92, 94. The blade 60 may be used to grade soil as indicated in FIG. 9.

What is claimed is:

1. Implement for working soil comprising a main frame, a hitch mounted on said main frame for attaching the main frame to a vehicle for moving the main frame along a path over soil in which the main frame extends substantially transverse to said path, multiple rigid scarifying teeth mounted on said frame for penetrating the soil for scarifying the soil, a pair of soil engaging members on opposite sides of said frame for supporting said frame on the soil, said frame being pivotable relative to said soil engaging members about an axis extending between said soil engaging members and transverse to said path to permit adjustment of the depth of penetration of said scarifying teeth into the soil, a blade carried on said main frame and being movable into a position engaging soil, said ground engaging members being wheels and said main frame being pivotably mounted on said wheels for movement about a wheel axis defined between said ground engaging members and extending transverse to said path, said axis being defined between said blade and said scarifying teeth.

2. Implement for working soil comprising a main frame, a hitch mounted on said main frame for attaching the main frame to a vertical and rotational orientation controllable hitch on a vehicle for moving the main frame along a path over soil in which the main frame extends substantially transverse to said path, multiple rigid scarifying teeth mounted on said frame for penetrating the soil for scarifying the soil, a pair of rotatable soil engaging members on opposite sides of said frame for supporting said frame on the soil, said frame being pivotably mounted to said soil engaging members about an axis extending between said soil engaging members and transverse to said path to permit adjustment of the depth of penetration of said scarifying teeth into the soil by pivotal adjustment of said frame about said axis, a blade carried on said main frame and being movable into a position engaging soil, said axis extending between said blade and said scarifying teeth.

3. Implement as claimed in claim 2, wherein said soil engaging members are wheels, said depth of penetration of teeth into the soil may be further adjusted by horizontally shifting said wheels with respect to said.

4. Implement as claimed in claim 3, wherein said blade is mounted on a subframe pivotally connected to said main frame for movement about a subframe axis extending transverse to said path and parallel to said wheel axis.

5. Implement for working soil comprising a main frame, a hitch mounted on said main frame for attaching the main frame to a three point hitch on a vehicle for moving the main frame along a path over soil in which the main frame extends substantially transverse to said path, multiple tines extending from said frame for engaging soil at an angle to work and grade the soil, a pair of rotatable soil engaging members on opposite sides of said frame for supporting said frame on the soil, said frame being pivotable relative to said soil engaging members about an axis extending between said soil engaging members and transverse to said path to permit adjustment of said angle that the tines engage the soil, a blade being mounted on a subframe pivotally mounted on said main frame for movement about an axis extending transverse to said path and substantially parallel to the first mentioned axis extending between the soil engaging members, said first mentioned axis being between said blade and said tines.

6. Implement for working soil comprising a main frame, a hitch mounted on said main frame for attaching the main frame to a three point hitch on a vehicle for moving the main frame along a path over soil in which the main frame extends substantially transverse to said path, multiple tines extending from said frame for engaging soil at an angle to work and grade the soil, a pair of rotatable soil engaging members on opposite sides of said frame for supporting said frame on the soil, said frame being pivotable relative to said soil engaging members about an axis extending between said soil engaging members and transverse to said path to permit adjustment of said angle that the tines engage the soil, said main frame being pivoted about said axis via said hitch to adjust said angle at which the tines engage said soil.

7. Implement for working soil as claimed in claim 6, wherein said soil engaging members are wheels journalled about axles, said wheels mounted on said main frame by mounting members carried by opposite sides of the main frame, said mounting members including multiple generally horizontally spaced apart sockets receiving said axles extending from each of said wheels to permit the main frame to be raised and lowered relative to the wheels by moving the wheels to different ones of said sockets.

8. Implement for working soil comprising a main frame, a hitch mounted on said main frame for attaching the main frame to a three point hitch on a vehicle for moving the main frame along a path over soil in which the main frame extends substantially transverse to said path, multiple rigid scarifying teeth mounted on said frame for penetrating the soil for scarifying the soil, multiple tines extending from said frame for engaging soil at an angle to work and grade the soil, a pair of soil engaging members on opposite sides of said frame for supporting said frame on the soil, said frame being pivotable relative to said soil engaging members to permit adjustment of the depth of penetration of the scarifying teeth and the angle at which the tines engage the soil, a blade being mounted on a subframe pivotally mounted on said main frame for movement about a subframe axis extending transverse to said path and substantially parallel to the axis extending between said soil engaging members, said blade being located between said soil engaging members and said hitch.

9. Implement for working soil comprising a main frame, a hitch mounted on said main frame for attaching the main frame to a three point hitch on a vehicle for moving the main frame along a path over soil in which the main frame extends substantially transverse to said path, multiple rigid scarifying teeth mounted on said frame for penetrating the soil for scarifying the soil, multiple tines extending from said frame for engaging soil at an angle to work and grade the soil, a pair of rotatable soil engaging members on opposite sides of said frame for supporting said frame on the soil, said frame being pivotable relative to said soil engaging members to permit adjustment of the depth of penetration of the scarifying teeth and the angle at which the tines engage the soil, a blade being mounted on a subframe pivotally mounted on said main frame for movement about a subframe axis extending transverse to said path and substantially parallel to the axis extending between said soil engaging members, wherein said soil engaging members are located between the blade and said scarifying teeth.

* * * * *